(12) United States Patent
Hung

(10) Patent No.: US 11,819,379 B2
(45) Date of Patent: Nov. 21, 2023

(54) INDIRECT BONDING METHOD OF ORTHODONTIC BRACKET

(71) Applicant: Cheng-Hsiang Hung, New Taipei (TW)

(72) Inventor: Cheng-Hsiang Hung, New Taipei (TW)

(*) Notice: Subject to any disclaimer, the term of this patent is extended or adjusted under 35 U.S.C. 154(b) by 231 days.

(21) Appl. No.: 16/734,253

(22) Filed: Jan. 3, 2020

(65) Prior Publication Data

US 2020/0214806 A1   Jul. 9, 2020

Related U.S. Application Data

(60) Provisional application No. 62/788,232, filed on Jan. 4, 2019.

(51) Int. Cl.
*A61C 7/14* (2006.01)

(52) U.S. Cl.
CPC .................................. *A61C 7/146* (2013.01)

(58) Field of Classification Search
CPC ..................................................... A61C 7/146
See application file for complete search history.

(56) References Cited

U.S. PATENT DOCUMENTS

| 4,094,068 A * | 6/1978 | Schinhammer | A61C 7/146 |
| | | | 433/9 |
| 4,892,478 A * | 1/1990 | Tateosian | A61C 7/10 |
| | | | 264/16 |
| 6,565,355 B2 * | 5/2003 | Kim | A61C 7/146 |
| | | | 433/3 |

(Continued)

FOREIGN PATENT DOCUMENTS

| DE | 2009008384 B4 | 8/2013 | |
| DE | 102009008384 B4 * | 8/2013 | ............. A61C 7/146 |

(Continued)

OTHER PUBLICATIONS

JPH11221235A Bracket Positioning Cap and Bracket Attaching Method of Dental Corrective Tool, Aug. 17, 1999. [retrieved on Nov. 23, 2021], Translation retrieved from: Espacenet. (Year: 1999).*

(Continued)

*Primary Examiner* — Cris L. Rodriguez
*Assistant Examiner* — Courtney N Huynh
(74) *Attorney, Agent, or Firm* — McClure, Qualey & Rodack, LLP

(57) ABSTRACT

A method of producing a positioning guide for an orthodontic bracket is provided. The method includes determining and fixing a position of the orthodontic bracket in relation to a side surface of a corresponding tooth of a setup dental model, wherein the setup dental model has a dentition state of the patient's dental arch after orthodontic treatment;

(Continued)

forming a rigid guiding structure with a first part covering the outer surface of each orthodontic bracket and a second part covering the occlusal surface of the corresponding tooth; and forming a flexible linking structure to connect the first part and the second part of the rigid guiding structure to obtain the positioning guide for the respective orthodontic bracket, wherein the rigid guiding structure is inflexible and the flexible linking structure is elastic and retains form.

11 Claims, 10 Drawing Sheets

(56) References Cited

U.S. PATENT DOCUMENTS

| | | | |
|---|---|---|---|
| 8,308,478 B2 * | 11/2012 | Primus | A61C 7/16 433/24 |
| 8,734,690 B2 | 5/2014 | Komori | |
| 9,713,512 B2 * | 7/2017 | Okazaki | A61C 7/146 |
| 2008/0233530 A1 | 9/2008 | Cinader | |
| 2008/0233531 A1 * | 9/2008 | Raby | A61C 7/146 433/24 |
| 2010/0279243 A1 | 11/2010 | Cinader, Jr. et al. | |
| 2010/0300615 A1 | 12/2010 | Komori | |
| 2011/0091832 A1 * | 4/2011 | Kim | A61C 7/146 433/3 |
| 2013/0196279 A1 * | 8/2013 | Curiel | A61C 7/20 433/3 |
| 2014/0287376 A1 | 9/2014 | Hultgren et al. | |
| 2015/0064641 A1 * | 3/2015 | Gardner | A61C 9/004 700/98 |
| 2016/0074139 A1 * | 3/2016 | Machata | A61C 7/146 433/3 |

FOREIGN PATENT DOCUMENTS

| | | | | |
|---|---|---|---|---|
| JP | H1199161 A | | 4/1999 | |
| JP | H11221235 A | | 8/1999 | |
| JP | 2006043121 A | * | 2/2006 | A61C 7/14 |
| JP | 2006525077 A | | 11/2006 | |
| JP | 2010187915 A | | 9/2010 | |
| KR | 20010038279 A | * | 5/2001 | A61C 7/146 |
| KR | 20100094426 A | * | 8/2010 | A61C 7/146 |
| KR | 20100094426 A | | 8/2010 | |
| KR | 20150095747 A | | 8/2015 | |

OTHER PUBLICATIONS

JP2006043121 (Aso International KK) A Bracket Attaching Tool and Attaching Tool with Bracket for Orthodontic Appliance, Feb. 16, 2006. [retrieved on Nov. 23, 2021], Translation retrieved from: Espacenet. (Year: 2006).*

KR20100094426A (Orthostation Ltd) Lingual Bracket Rebonding Magnet Core, Aug. 26, 2010. [retrieved on Nov. 23, 2021], Translation retrieved from: Espacenet. (Year: 2010).*

KR20010038279A (Kim Yong Hwa, Park Je Young) Moulage Structure for Dental Correction Bracket and Transfer Tray Thereof, May 15, 2001. [retrieved on Apr. 18, 2022], Translation retrieved from: Espacenet (Year: 2001).*

Stratasys. Tango (Rubber-like) Family of Materials. PDF (online). 3 pages. Jul. 2016 [retrieved on Apr. 24, 2023]. Retrieved from Google: <URL:https://www.cadimensions.com/wp-content/uploads/2017/09/Application-Note-Tango-Rubber-like-Family-of-Materials.pdf> (Year: 2016).*

Prototyping Solutions. Transparent. Webpage (online). 2 pages. Sep. 27, 2017 [retrieved on Apr. 24, 2023]. Retrieved from Wayback Machine: <URL:https://web.archive.org/web/20170927092953/https://prototypingsolutions.com/materials/polyjet-photopolymers/transparent/> (Year: 2017).*

Smooth-On. Durometer Shore Hardness Scale. Webpage [online]. 2 pages. Apr. 14, 2019 [retrieved on Apr. 14, 2023] Retrieved from Wayback Machine: <URL:https://web.archive.org/web/20190414004716/https://www.smooth-on.com/page/durometer-shore-hardness-scale/> (Year: 2019).*

KR20100094426A (Hashimoto Shuji) (Orthostation Ltd) Lingual Bracket Rebonding Magnet Core, Aug. 26, 2010. [retrieved on Nov. 23, 2021], Translation retrieved from: Espacenet. (Year: 2010).*

DE102009008384B4 Apparatus and Method for Indirect Bonding for Orthodontic Treatment Devices, Aug. 22, 2013. [retrieved on Nov. 23, 2021], Translation retrieved from: Espacenet. (Year: 2013).*

Japan Patent Office, Office Action, Patent Application Serial No. 2019-239609, dated Mar. 23, 2021, Japan.

European Patent Office, Search Report, Application Serial No. 20150272.1, dated Apr. 30, 2020, Europe.

* cited by examiner

INDIRECT BONDING METHOD OF ORTHODONTIC BRACKET

CROSS REFERENCE TO RELATED APPLICATIONS

The present application claims the benefit of U.S. Provisional Patent Application No. 62/788,232, filed Jan. 4, 2019, the entirety of which is incorporated by reference herein.

BACKGROUND OF THE INVENTION

Field of the Invention

The present application relates to an indirect bonding method of orthodontic brackets, and in particular to a method of producing a positioning guide used for bonding an orthodontic bracket to each tooth of a patient.

Description of the Related Art

In an orthodontic treatment, orthodontic brackets are commonly bonded to each tooth individually, and an orthodontic archwire placed adjacent to the lower or upper dental arch connects the orthodontic brackets on the dental arch to induce force on the teeth through the orthodontic brackets, thereby aligning the teeth with the pre-shaped form of the orthodontic archwire. It is very important to install the orthodontic brackets at proper positions in order to obtain the ideal treatment effect.

In order to more accurately determine an installing position of an orthodontic bracket, a method called an indirect bonding method has been employed. In an indirect bonding method, a dentist makes a positioning guide having the shape of a patient's dentition. A set of orthodontic brackets are releasably attached to the positioning guide. When the patient is ready, the bonding surfaces of the orthodontic brackets and/or the tooth surfaces are coated with adhesive. The positioning guide is then placed in the patient's mouth and pressed over the patient's teeth until the adhesive cures. The positioning guide is then removed from the mouth, while the orthodontic brackets remain firmly bonded to the tooth surfaces. Thus, the orthodontic brackets are transferred from the positioning guide and become bonded to the tooth surfaces at their desired positions. The conventional positioning guide is typically made of a flexible polymer material (e.g., EVA resin) only.

Although existing indirect bonding methods have been adequate for their intended purposes, they have not been entirely satisfactory in all respects. For example, a problem which may occur is that the installing position of the orthodontic bracket easily deviates when transferring the positioning guide. Therefore, there is a need for an improved indirect bonding method to facilitate precise and easy positioning of orthodontic brackets.

BRIEF SUMMARY OF THE INVENTION

In accordance with some embodiments of the invention, a method of producing a positioning guide used for bonding an orthodontic bracket to a tooth of a patient is provided. The method includes determining and fixing a position of the orthodontic bracket in relation to a side surface of a corresponding tooth of a setup dental model, wherein the setup dental model has a dentition state of the patient's dental arch after orthodontic treatment. The method also includes forming a rigid guiding structure with a first part covering a part of the outer surface of the orthodontic bracket and a second part covering the occlusal surface of the corresponding tooth of the setup dental model, wherein the first part and the second part of the rigid guiding structure are separated. In addition, the method includes forming a flexible linking structure to connect the first part and the second part of the rigid guiding structure to obtain the positioning guide for the orthodontic bracket. The rigid guiding structure is inflexible and the flexible linking structure is elastic and retains form.

In some embodiments, the second part of the rigid guiding structure includes a handle portion having a greater thickness than the other portions of the second part. The method further includes forming a positioning guide unit by transferring a plurality of the orthodontic brackets integrated with the respective positioning guide to an original dental model reproducing the dentition state of the patient's dental arch before orthodontic treatment. In addition, the method includes joining a number of the adjacent positioning guides at the handle portions using at least one holding part.

In some embodiments, the at least one holding part and the rigid guiding structure comprises the same material.

In some embodiments, the rigid guiding structure comprises a photopolymerizable material, and the formation of the rigid guiding structure comprises curing the photopolymerizable material via light energy. The photopolymerizable material comprises DURALAY™ resin, dental tray resin, or the like.

In some embodiments, the flexible linking structure comprises a photopolymerizable material, and the formation of the flexible linking structure comprises curing the photopolymerizable material via light energy. The photopolymerizable material comprises ethylene vinyl acetate (EVA) resin or the like.

In some embodiments, the flexible linking structure is formed on the side surface of the corresponding tooth of the setup dental model.

In some embodiments, the second part of the rigid guiding structure further extends to cover a part of a second side surface, opposite to the side surface, of the corresponding tooth of the setup dental model. The flexible linking structure further has a portion formed in the second part on the second side surface.

In some embodiments, the method further includes forming a rigid linking structure adjacent to the flexible linking structure to connect the first part and the second part of the rigid guiding structure. The rigid linking structure is harder than the flexible linking structure.

In some embodiments, the rigid linking structure and the rigid guiding structure comprise the same material.

In accordance with some embodiments of the invention, a dental appliance is also provided. The dental appliance includes an orthodontic bracket and a positioning guide configured to position the orthodontic bracket on a tooth of the patient. The orthodontic bracket has a bonding surface for adhering to tooth. The positioning guide includes a rigid guiding structure and a flexible linking structure. The rigid guiding structure includes a first part and a second part separated from each other. The first part is configured to cover a part of an outer surface of the orthodontic bracket opposite to the bonding surface. The second part has a shape matching the occlusal surface of the tooth. The flexible linking structure is configured to connect the first part and the second part of the rigid guiding structure. The rigid guiding structure is inflexible and the flexible linking structure is flexible and retains elasticity.

In some embodiments, the second part of the rigid guiding structure includes a handle portion having a greater thickness than the other portions of the second part.

In some embodiments, the dental appliance further includes a plurality of the orthodontic brackets, a plurality of the positioning guides, and at least one holding part configured to integrate a number of the adjacent positioning guides at the handle portions.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
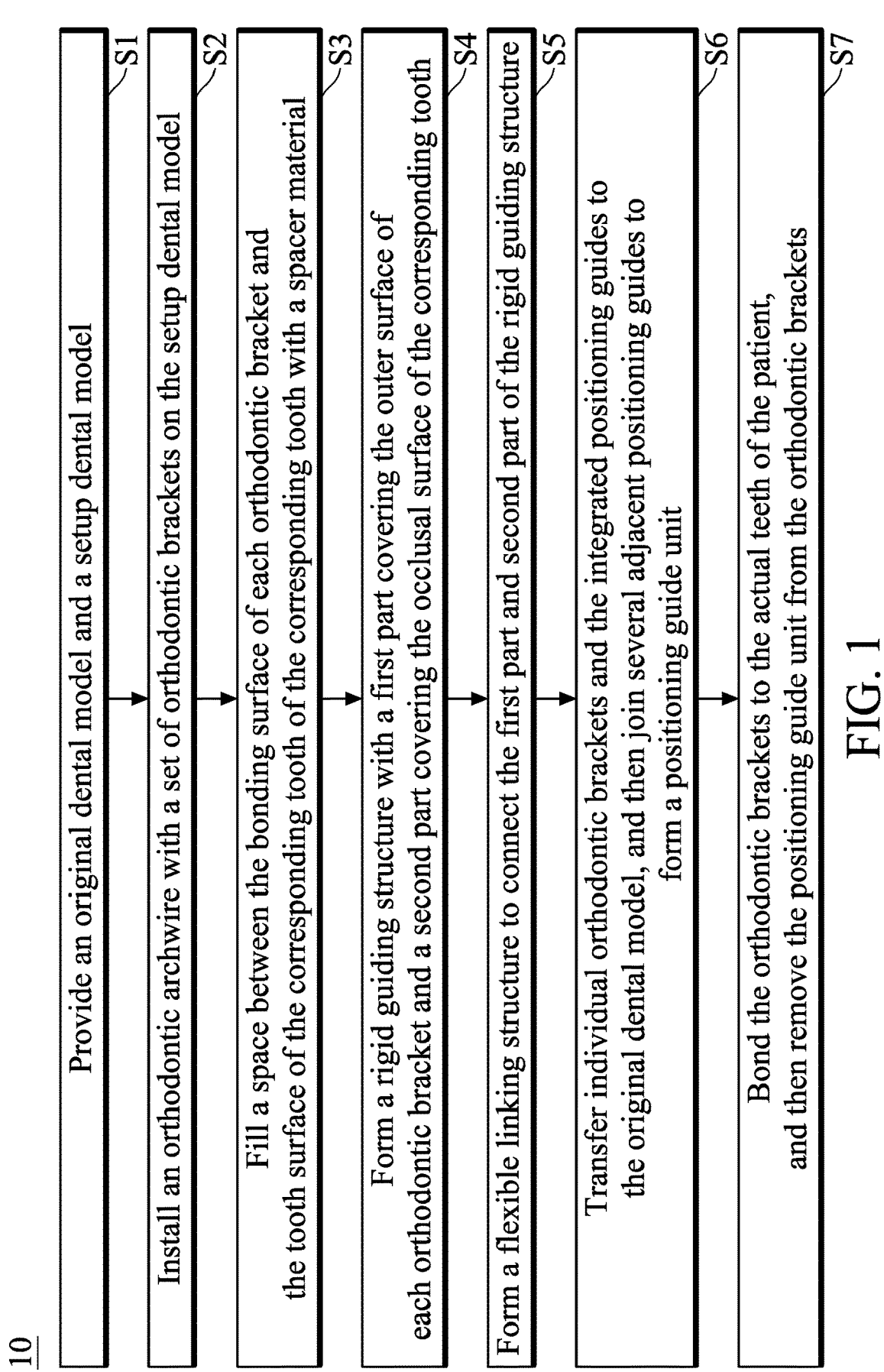
FIG. 1 is a simplified flow chart of an indirect bonding method, in accordance with some embodiments.

The following disclosure provides many different embodiments, or examples, for implementing different features of the invention. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Various features may be arbitrarily drawn in different scales for the sake of simplicity and clarity.

Furthermore, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The device may be otherwise oriented (rotated 90 degrees or at other orientations) and the spatially relative descriptors used herein may likewise be interpreted accordingly.

It should be understood that additional operations can be provided before, during, and after the method described below, and some of the operations described can be replaced or eliminated for other embodiments of the method.

Embodiments of an improved indirect bonding method of orthodontic brackets are provided. The following embodiments relate in particular to an improved method of producing a positioning guide used for assisting the positioning of an orthodontic bracket on each tooth of a patient. The improved indirect bonding method facilitates precise and easy positioning of orthodontic brackets. Other advantages will be explained later. Some variations of the embodiments are described. Throughout the various views and illustrative embodiments, common elements use the same reference number.

FIG. 1 is a simplified flow chart of an indirect bonding method 10, in accordance with some embodiments. For illustration, the flow chart will be described along with the drawings shown in FIGS. 2 to 9. Some of the described operations can be replaced or eliminated in different embodiments. Alternatively, some operations may be added in different embodiments.

Figure 2:
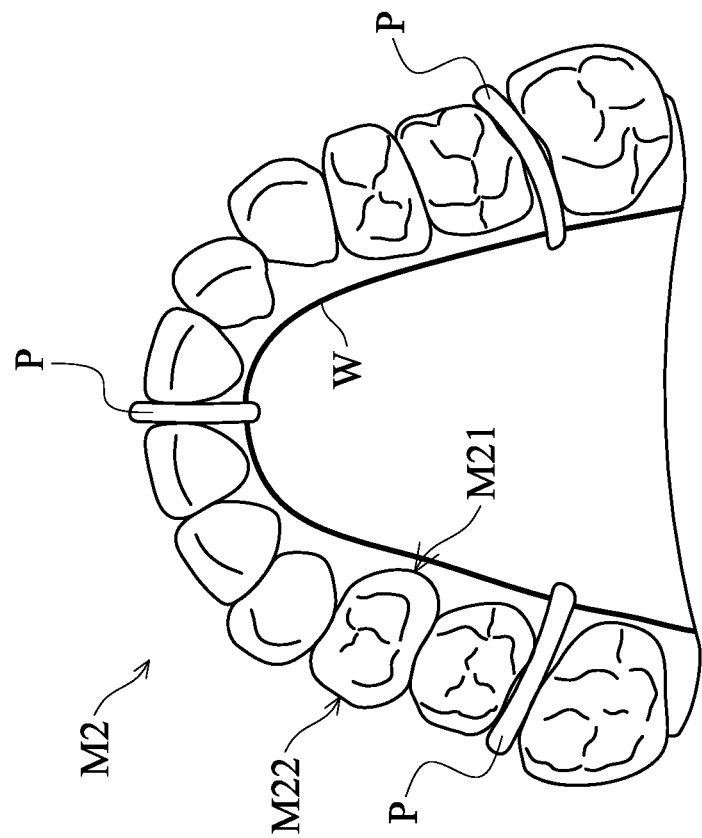
FIG. 2 is schematic top views of an original dental model and a setup dental model of a dental arch of a patient, in accordance with some embodiments.
Figure 2:
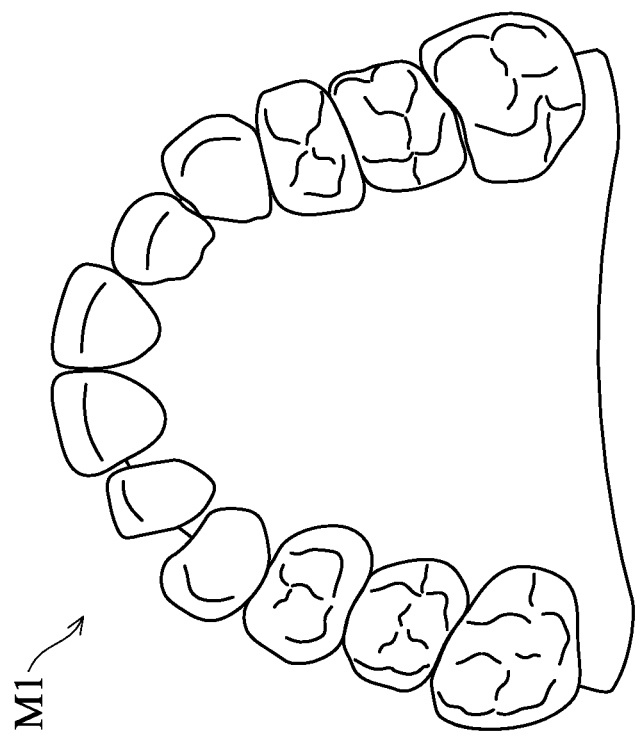

The indirect bonding method 10 begins with operation 51, in which an original dental model M1 and a setup (or desired) dental model M2 of a dental arch (e.g., a lower or upper dental arch) of a patient are provided, as shown in FIG. 2. The original dental model M1 reproduces the dentition state of the dental arch of the patient before orthodontic treatment. For example, a dentist may take an impression of the patient's dental arch and digitally scan the impression or may make directly an intraoral scan of the patient's mouth. The original dental model M1 is then be made from the impression or the intraoral scan image using techniques well known in the art (e.g., gypsum molding). The setup dental model M2 has the desired dentition state of the patient's dental arch after orthodontic treatment. For example, the setup dental model M2 can be derived from the original dental model M1 by manually moving each tooth of the original dental model M1 to the desired orientation or position (i.e. the orientation or position after orthodontic treatment). Alternatively, a digital setup dental model can be created by a computer simulated approach, and the setup dental model M2 is made from the digital model using techniques well known in the art (e.g., gypsum molding).

It should be appreciated that after determining the installing position of each orthodontic bracket on the setup dental model M2 having the desired dentition state, the orthodontic brackets are transferred and installed to the actual teeth of the patient before the actual orthodontic treatment. Therefore, the installing positions of the orthodontic brackets become ideal. The setup dental model M2 having such the desired dentition state can be used because the indirect bonding method 10 embodiments described below uses a positioning guide and can accurately reproduce the installing positions of the orthodontic brackets determined on the setup dental model M2 on the actual teeth of the patient.

In some embodiments, a separating material is applied to the setup dental model M2 and/or the original dental model M1 prior to positioning the orthodontic brackets on the dental model(s). The separating material helps make removing the orthodontic brackets and other integrated components (which will be described later) from the dental model(s). The application of a separating material is well-known in the art and is thus not discussed here.

The indirect bonding method 10 continues to operation S2, in which an orthodontic archwire W engaged with a set of orthodontic brackets is installed on the setup dental arch M2, as shown in FIG. 2 (the orthodontic brackets are not shown in FIG. 2 for simplicity). The orthodontic archwire W can be fixed in place on the setup dental arch M2 via supports P. In some cases, if each orthodontic bracket is to be bonded to the tongue side surface of each tooth of the patient for the subsequent actual orthodontic treatment, the orthodontic archwire W is placed at the tongue side M21 of the setup dental arch M2, as shown in FIG. 2. In some unillustrated cases, if each orthodontic bracket is to be bonded to the cheek side surface of each tooth of the patient for the subsequent actual orthodontic treatment, the orthodontic archwire W is placed at the cheek side M22 of the setup dental arch M2. The orthodontic archwire W is resilient (e.g., made of shape memory alloy (SMA) or other available metallic materials) and formed to match the setup dental arch M2. The positions of the orthodontic brackets are determined by engaging the orthodontic brackets to the fixed orthodontic archwire W.

Figure 3:
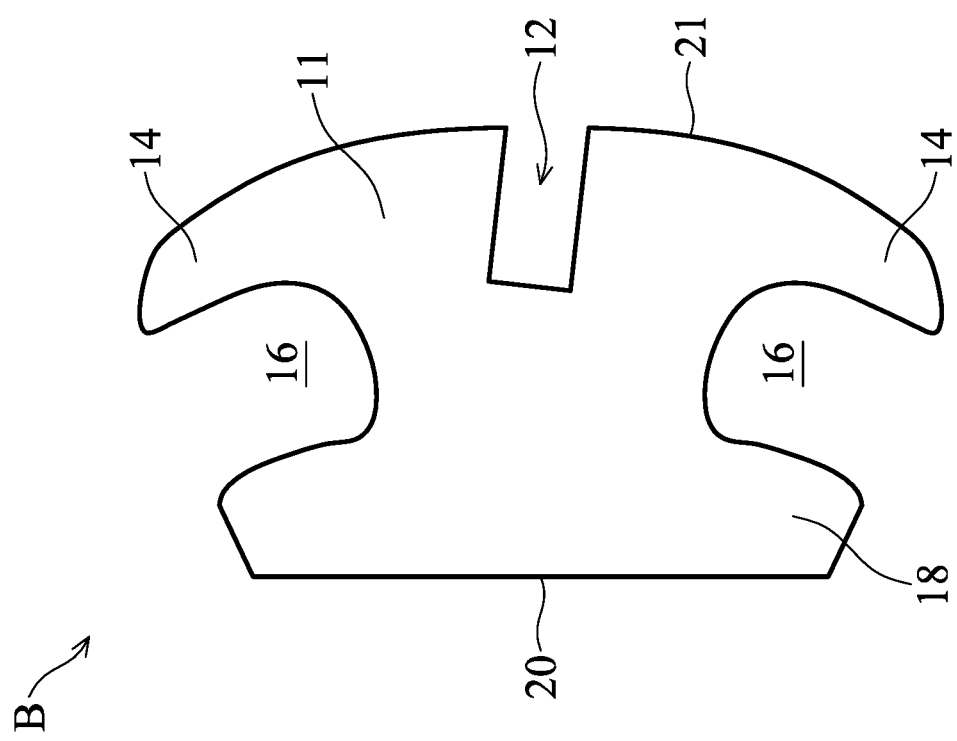
FIG. 3 is a schematic side view of an orthodontic bracket, in accordance with some embodiments.

FIG. 3 is a schematic side view of an orthodontic bracket B, in accordance with some embodiments. In some embodiments, the used orthodontic bracket B includes a main body 11 having a central longitudinal groove 12 for receiving the orthodontic archwire W (not shown in FIG. 3 for simplicity). The main body 11 further has upper and lower tie wings 14 defining wire tie-down grooves 16. A bracket base 18 is integrated with the main body 11 and has a bonding surface 20 for bonding the orthodontic bracket B to the tooth surface (e.g., the tongue or cheek side surface) of a tooth of the patient. While the orthodontic archwire W is installed on the setup dental arch M2 in operation S2, the bonding surface 20 of each orthodontic bracket B faces the tooth surface (e.g., the tongue or cheek side surface) of a corresponding tooth of the setup dental arch M2 to be bonded (see FIG. 4). The above orthodontic bracket B is merely an illustrative example, and other types or shapes of orthodontic brackets can also be used. The orthodontic bracket B may be made of or comprise ceramic, metal, or other available materials (such as polycarbonate).

Figure 4:
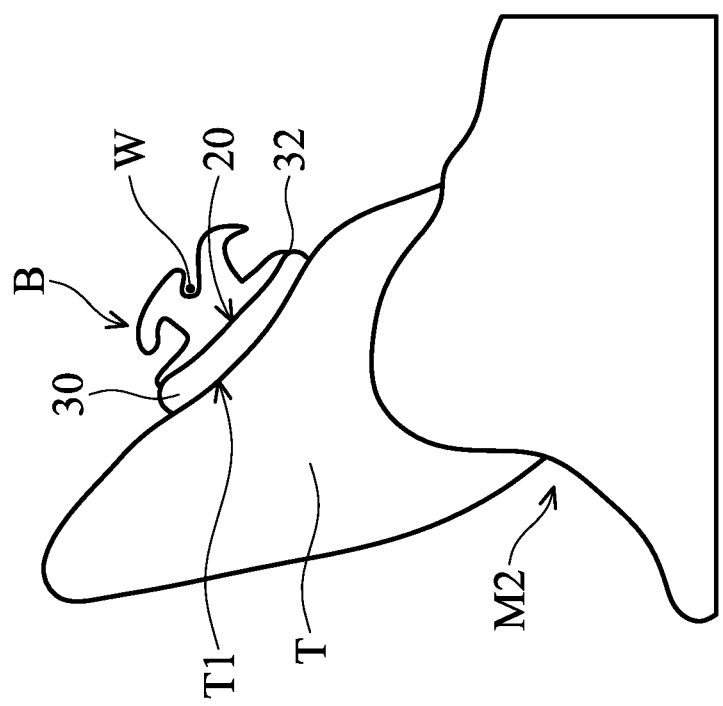
FIG. 4 is a schematic side view showing an orthodontic bracket being bonded to the tongue side surface of a tooth of the setup dental model in FIG. 2, in accordance with some embodiments.

The indirect bonding method 10 continues to operation S3, in which a space between the bonding surface 20 of each orthodontic bracket B and the tooth surface (e.g., the tongue side surface T1) of the corresponding tooth T of the setup dental model M2 is filled with a pad material 30, as shown in FIG. 4. In some embodiments, a primer layer 32 is coated on the bonding surface 20 of the orthodontic bracket B prior to the formation of the pad material 30 in order to facilitate the adhesion of the pad material 30 to the bonding surface 20. The primer layer 32 may be chemical-cured, light-cured, or dual-cured prior to the next step.

After the coated primer layer 32 has been cured, a pad material 30 is coated over the primer layer 32 to fill a space between each orthodontic bracket B and the corresponding tooth T of the setup dental model M2. Then, the coated pad material 30 is cured to temporarily adhere the orthodontic bracket B to the tooth surface of the corresponding tooth T which is previously coated with a separating material. As such, the installing position of each orthodontic bracket B on the setup dental model M2 (as well as on the actual teeth of the patient) is determined. The orthodontic archwire W is removed after the orthodontic brackets B are bonded to the teeth of the setup dental model M2, in some embodiments.

In some embodiments, the primer layer 32 and the pad material 30 are made of one or more dental restorative materials. These dental restorative materials are known in the art and contain photopolymerizable resins such as acrylate or methacrylate resins (for example, ethoxylated bisphenol A dimethacrylate (EBPADMA); urethane dimethacrylate (UDMA) and triethylene glycol dimethacrylate (TEGDMA)); polymerization initiators (for example, camphorquinone (CQ)); polymerization accelerators (for example, ethyl 4-dimethylamino benzoate (EDMAB)); filler particles (for example, silica and glasses); and additives (for example, blue or ultraviolet-light absorbers, anti-oxidants, plasticizers, and the like). Alternatively, glass-ionomer materials (based on the reaction of silicate glass powder that is usually a fluoroaluminosilicate, and polyalkeonic acid) may be used alone or in combination with such photopolymerizable resins. In some embodiments, in order to fill the space between the bonding surface and the tooth surface, the pad material 30 has higher viscosity than the primer layer 32. In some other embodiments, the primer layer 32 can also be omitted.

Figure 5:
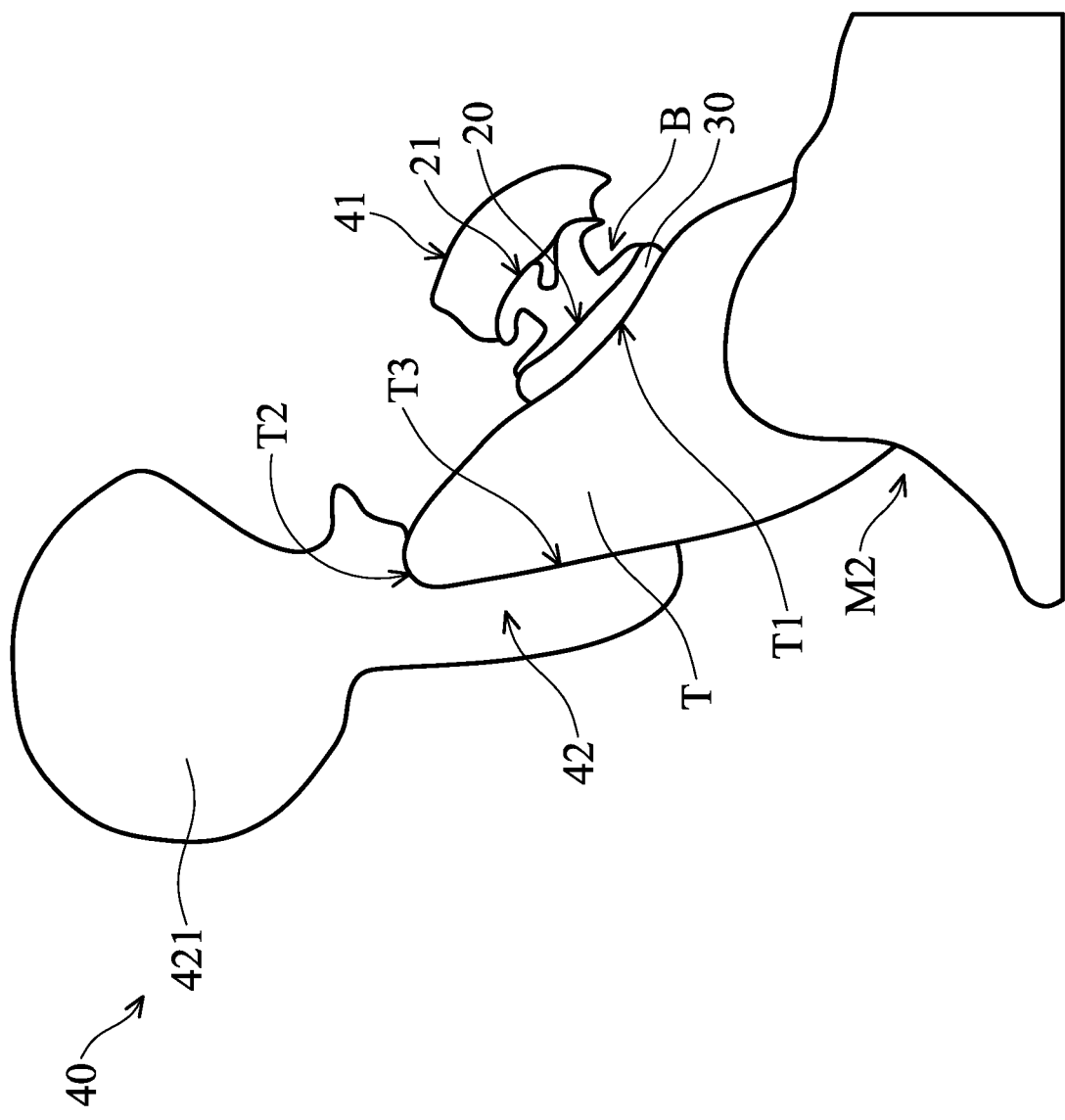
FIG. 5 is a schematic side view showing the formation of a rigid guiding structure consisting of two separated parts, in accordance with some embodiments.

The indirect bonding method 10 continues to operation S4, in which a rigid guiding structure 40 consisting of two separated parts (i.e. with a gap therebetween) is formed, as shown in FIG. 5. The rigid guiding structure 40 is a part of a positioning guide PG (see FIG. 6) provided in the disclosure used for transferring the orthodontic bracket B to the actual tooth of the patient. The term "rigid guiding structure" used herein indicates that it is inflexible and does not deform during transfer of the orthodontic bracket B.

In some embodiments as shown in FIG. 5, the formed rigid guiding structure 40 includes a first part 41 fitting and covering a part or the entire outer surface 21 (see also FIG. 3) of an orthodontic bracket B, wherein the outer surface 21 is opposite to the bonding surface 20. The formed rigid guiding structure 40 further includes a second part 42 fitting and covering the occlusal surface T2 of a corresponding tooth T of the setup dental model M2. In some embodiments, the second part 42 further extends to cover a part of the opposing tooth surface (e.g., the cheek side surface T3) of the tooth T of the setup dental model M2, as shown in FIG. 5. With the above configurations, each orthodontic bracket B can be accurately installed on each actual tooth of the patient by only fitting the second part 42 to each tooth of the patient so as to cover the occlusal surface, which will be further described later.

In some embodiments, the second part 42 of the rigid guiding structure 40 further has a handle portion 421 which has a greater thickness than the other portions of the second part 42, as shown in FIG. 5. The handle portion 421 is formed as an extension portion of the rigid guiding structure 40 so as to facilitate manipulation and provide a convenient area for connecting adjacent rigid guiding structures 40, which will be further described later. The handle portion 421 may have a substantially circular cross-section, in some embodiments. However, other cross-sectional shapes can also be used as long as the above effects can be achieved.

the rigid guiding structure 40 is made of or comprises a photopolymerizable material, such as a Duralay resin, a dental tray resin, or another available photopolymerizable resin. To form the rigid guiding structure 40, a photopolymerizable material in liquid state is applied (e.g., by injection) to the outer surface 21 of an orthodontic bracket B and the occlusal surface T2 of the corresponding tooth T of the setup dental model M2. Then, the photopolymerizable material is cured via appropriate light energy. Thus, both mechanical and chemical bonding of the rigid guiding structure 40 can occur. The rigid guiding structure 40 may be transparent, translucent, or colored, in some examples. In some embodiments, the formed rigid guiding structure 40 does not extend to engage the undercut of the orthodontic bracket B, as shown in FIG. 5.

Figure 6:
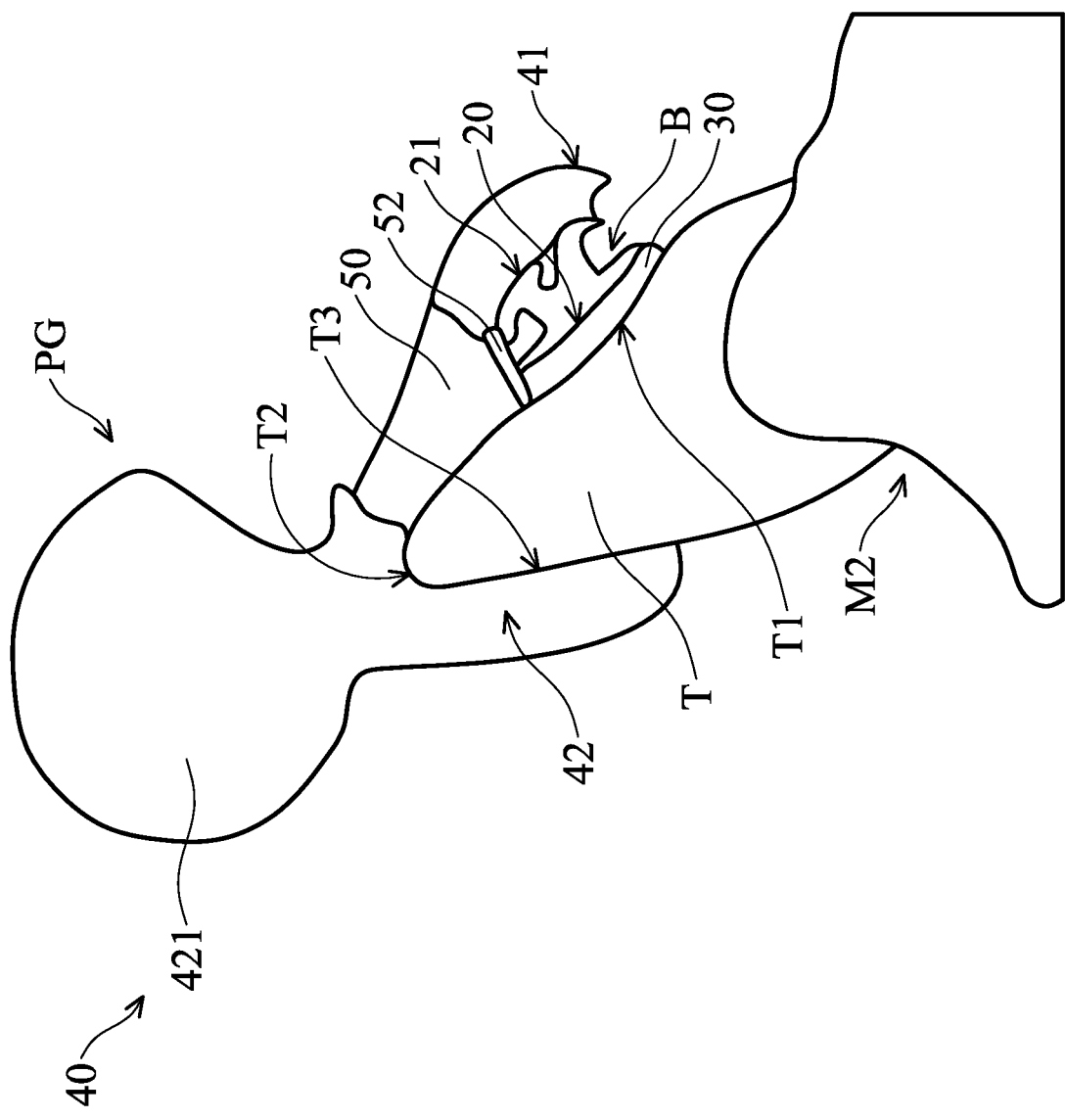
FIG. 6 is a schematic side view showing the formation of a flexible linking structure for integrating the two parts of the rigid guiding structure, in accordance with some embodiments.

The indirect bonding method 10 continues to operation S5, in which a flexible linking structure 50 is formed to connect the first part 41 and the second part 42 of the rigid guiding structure 40, as shown in FIG. 6. The flexible linking structure 50 is also a part of a positioning guide PG provided in the disclosure used for transferring the orthodontic bracket B to the actual tooth of the patient. The terms "flexible linking structure" used herein indicates that it is flexible and retains elasticity (for example, the flexible linking structure 50 may flex or deform under pressure, and return to its original shape when the pressure is released). This helps the formed positioning guide PG to be removed later from the orthodontic bracket B, which will be further described later.

In some embodiments as shown in FIG. 6, the flexible linking structure 50 is formed on the tooth surface (e.g., the tongue side surface T1) of the tooth T of the setup dental model M2 bonded with the orthodontic bracket B to integrate with the first part 41 and the second part 42 of the rigid guiding structure 40. In some embodiments, before forming the flexible linking structure 50, a barrier layer 52 (see FIG. 6) is previously formed in order to prevent the subsequently formed flexible linking structure 50 from integrating with the pad material 30. The barrier layer 52 may be made of or include dental wax or silicone to ensure separation.

Figure 6A:
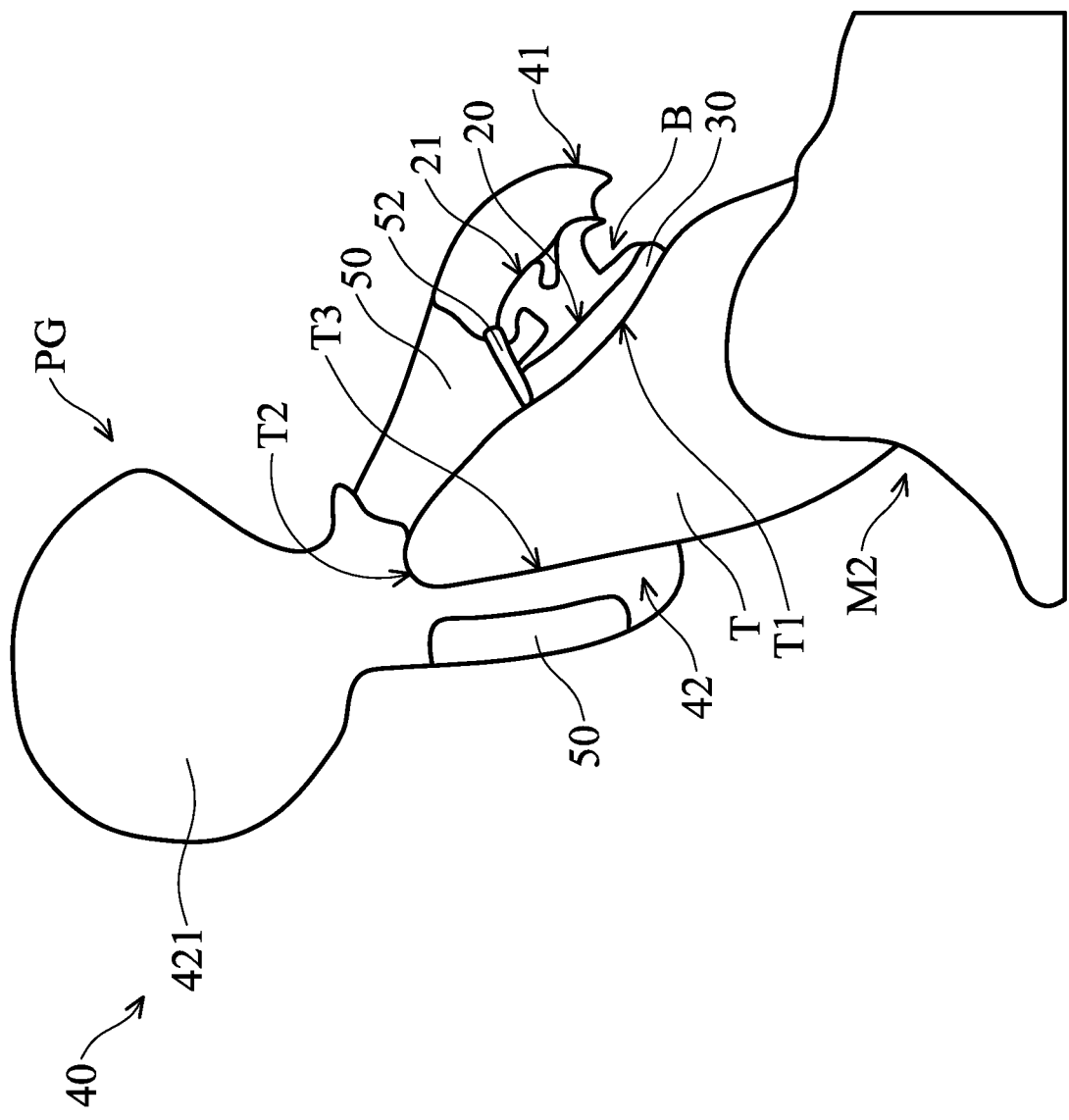
FIG. 6A is a schematic side view showing the flexible linking structure being formed on tongue and cheek side surfaces of the tooth, in accordance with some embodiments.

In some alternative embodiments as shown in FIG. 6A, the flexible linking structure 50 further has a portion formed in a region of the second part 42 of the rigid guiding structure 40 on the opposing tooth surface (e.g., the cheek side surface T3) of the tooth T of the setup dental model M2. That is, in addition to the tooth surface bonded to the orthodontic bracket B, the flexible linking structure 50 also contacts and conforms to the opposing tooth surface without an orthodontic bracket B. With the above configuration, the flexible linking structure 50 allows the positioning guide to flex at the appropriate locations so as to facilitate the mounting and removal from the actual tooth of the patient.

In some embodiments, the flexible linking structure 50 is made of or comprises a photopolymerizable material, such as an ethylene vinyl acetate (EVA) resin or another available photopolymerizable resin. To form the flexible linking structure 50, a photopolymerizable material in liquid state is applied (e.g., by injection) to a gap between the first part 41 and the second part 42 of the rigid guiding structure 40 and/or a previously formed recess (see FIG. 6A) in the second part 42. Then, the photopolymerizable material is cured via appropriate light energy. Thus, both mechanical and chemical bonding of the flexible linking structure 50 can occur. The flexible linking structure 50 may be transparent, translucent, or colored, in some examples. In some embodiments, the formed flexible linking structure 50 does not extend to engage the undercut of the orthodontic bracket B, as shown in FIG. 6.

Figure 7:
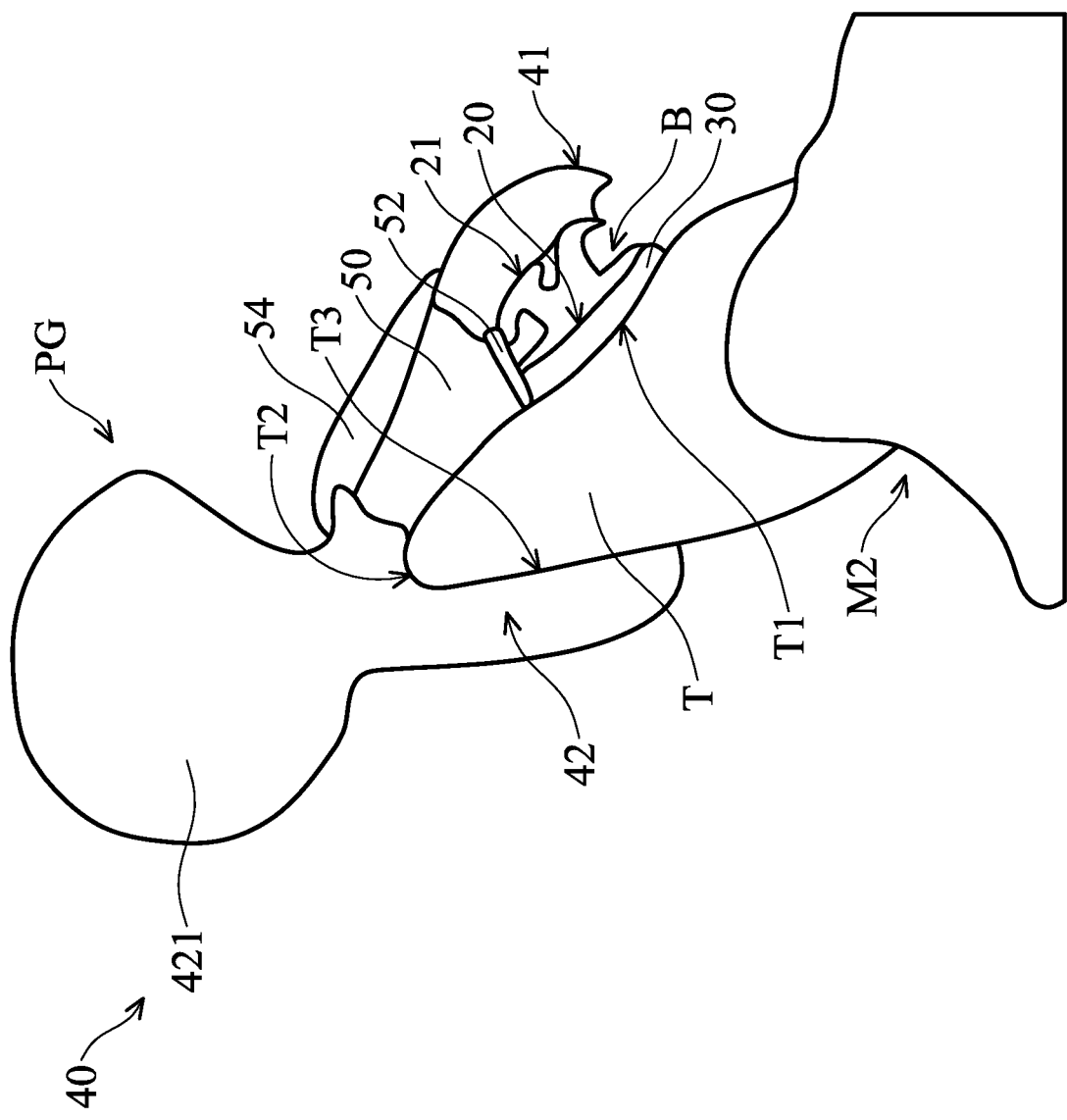
FIG. 7 is a schematic side view showing the formation of a rigid linking structure for integrating the two parts of the rigid guiding structure, in accordance with some embodiments.

In some embodiments as shown in FIG. 7, after the flexible linking structure 50 is formed, a rigid linking structure 54 is further formed adjacent to the flexible linking structure 50 to connect the first part 41 and second part 42 of the rigid guiding structure 40 so as to enhance the structural integrity and strength of the formed positioning guide PG. The rigid linking structure 54 may be harder than the flexible linking structure 50. For example, the rigid linking structure 54 and the rigid guiding structure 40 may comprise the same material (e.g., a DURALAY™ resin). Alternatively, the rigid linking structure 54 and the rigid guiding structure 40 may comprise similar materials (for example, one of which comprises a DURALAY™ resin, and the other comprise a dental tray resin). After the rigid linking structure 54 is applied over the flexible linking structure 50 and parts of the first part 41 and second part 42, it is cured via appropriate light energy.

Through the above operations, a positioning guide PG (see FIGS. 6 to 8) including at least a rigid guiding structure 40 with two separated parts and a flexible linking structure 50 is formed to integrate with each orthodontic bracket B temporarily bonded to the setup dental model M2. Since the tooth surface of each tooth T of the setup dental model M2 is previously coated with a separating material, individual orthodontic brackets B and the integrated positioning guides PG (as well as the integrated pad materials 30) can be easily removed.

Figure 8:
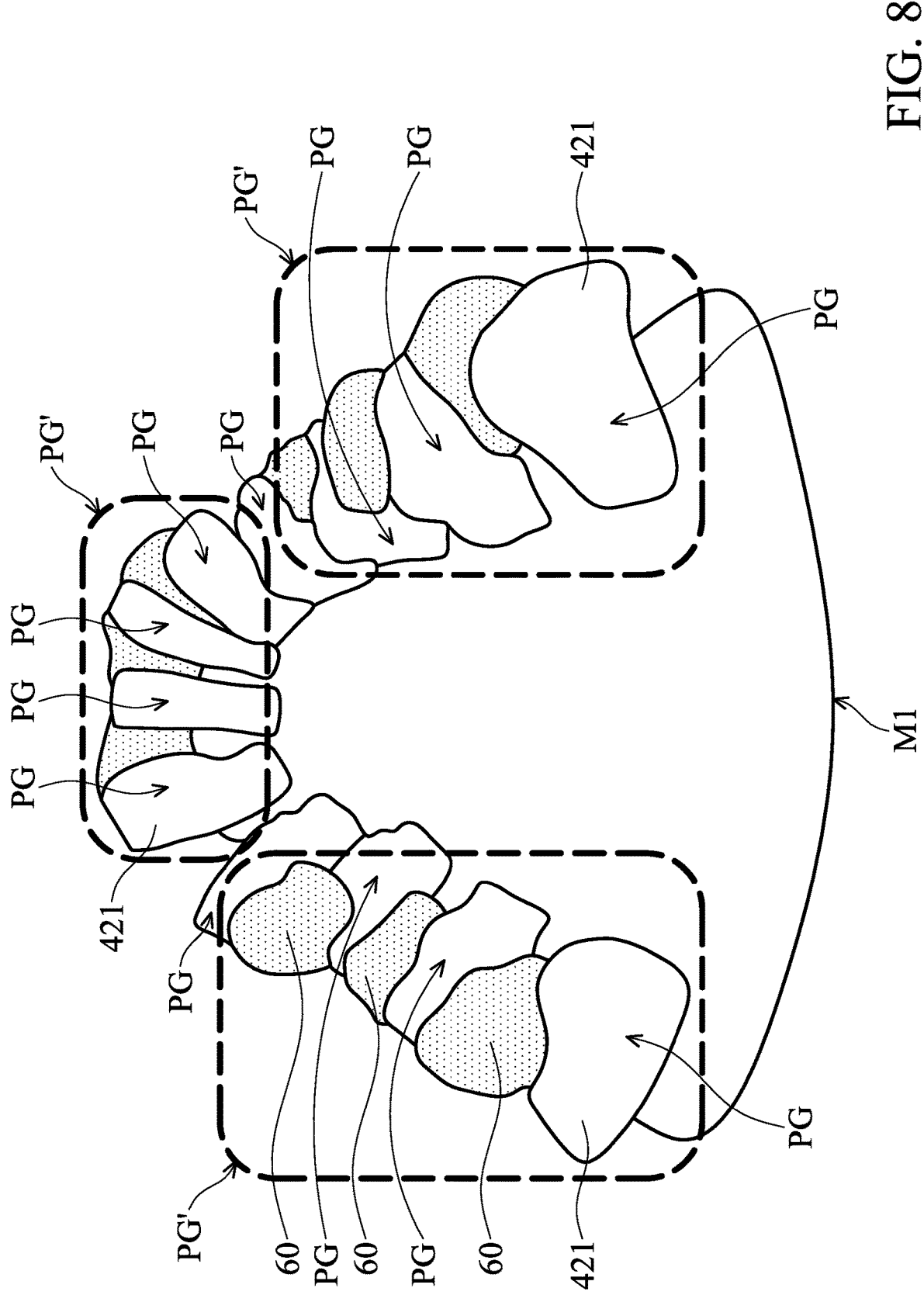
FIG. 8 is a schematic top view showing the formation of several positioning guide units, in accordance with some embodiments.

The indirect bonding method 10 continues to operation S6, in which individual orthodontic brackets and the integrated positioning guides PG are transferred to the original dental model M1 obtained in operation 51, as shown in FIG. 8 (the orthodontic brackets are not shown due to limited viewing angle). Each orthodontic bracket and the integrated positioning guide PG may be placed or positioned on the teeth of the original dental model M1 in a manner similar to the placement on the teeth of the setup dental model M2 (for example, as shown in FIG. 7). Then, several adjacent individual positioning guide PG are joined at the handle portions 421 of the second parts 42 using holding parts 60 to form a positioning guide unit PG'. The holding parts 60 may comprise the same material as the rigid guiding structure 40 discussed above, but any other suitable dense, accurate, and non-shrinking material that can be handled without distortion or temperature changes can also be used for the holding parts 60, as well as the rigid guiding structures 40 and the rigid linking structures 54. For the flexible linking structure 50, any other suitable high strength, elastic, and highly durable material that conforms to the shape of the dental model without warp after forming and distortion after removal, can also be used.

In some embodiments as shown in FIG. 8, three positioning guide units PG' are formed, one of which covers several anterior teeth, another covers several left teeth, and another covers several right teeth of the original dental model M1. However, the invention is not limited to these embodiments, and one or more positioning guide units PG' each consisting of any number of the positioning guides PG may also be formed as desired. The tooth surface of each tooth of the original dental model M1 is also previously coated with a separating material to facilitate removal of the positioning guide units PG' and the integrated orthodontic brackets B.

Figure 9:
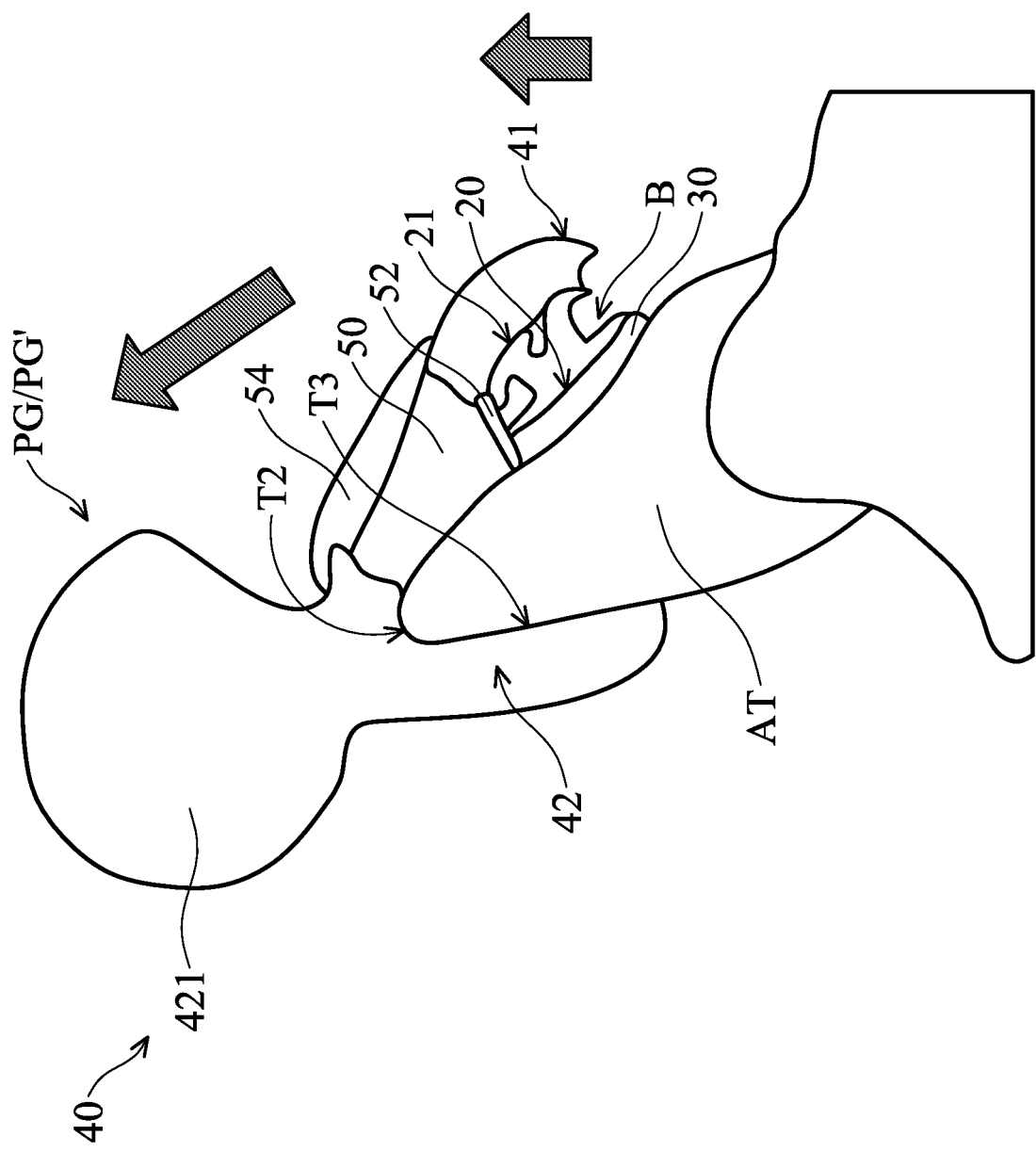
FIG. 9 is a schematic side view showing that the positioning guide is removed after the orthodontic bracket is bonded to an actual tooth of the patient, in accordance with some embodiments.

The indirect bonding method 10 continues to operation S7, in which individual positioning guide units PG' and the integrated orthodontic brackets B are transferred to the actual teeth AT of the corresponding dental arch of the patient for bonding, as shown in FIG. 9. As discussed above, each orthodontic bracket B can be accurately installed on each actual tooth AT of the patient by only fitting the second part 42 of the rigid guiding structure 40 to each actual tooth AT of the patient so as to cover the occlusal surface, as shown in FIG. 9. The shape and orientation of the positioning guide PG and the integrated orthodontic bracket B are maintained (due to the rigidity of the rigid guiding structure 40) when transferred to the actual tooth of the patient, thereby providing precise positioning. Moreover, each positioning guide unit PG' is formed to fit multiple adjacent teeth of the original dental model M1 reproducing the dentition state of the patient, and therefore it maintains better positioning accuracy when transferring a set of orthodontic brackets B to the corresponding actual teeth AT of the patient. A bonding adhesive (not shown) is previously coated over the pad material 30 on the bonding surface 20 of each orthodontic bracket B and/or the tooth surface (e.g., the tongue side surface T1) of the corresponding actual tooth AT.

In a method of transferring predetermined bracket positions from the dental models onto the dentition using a positioning guide, the problem of maintaining positional accuracy must be addressed. In terms of positional accuracy, the position in the occlusal to gingival direction is more easily maintained than the position in the mesial to distal direction. In the case of lingual brackets, adjacent teeth in a crowded dentition introduces new undercuts that must be worked around to properly seat the positioning guide onto the dentition. If the positioning guide is a single structure made of a flexible material, it must stretch, primarily in the mesial to distal direction, to work around the crowded adjacent teeth. However, the stretched positioning guide may not completely recover its form and thus lose positional accuracy. To maintain positional accuracy in the mesial to distal direction, the present invention provides a method of forming a rigid structure that links a rigid guiding structure, a rigid linking structure, and holding part that holds adjacent positioning guides in a unit. In addition, the section of the dentition can be carefully selected to use a positioning guide unit with minimal stretching. More specifically, when one positioning guide PG is positioned on an actual tooth AT, the rigid guiding structure 40, the rigid linking structure 54, and the holding part 60 connected to an adjacent positioning guide PG together maintains positional accuracy for the placement of the integrated orthodontic bracket B on the actual tooth AT in the mesial to distal direction, which improves upon conventional positioning guides that use entirely or primarily EVA or other flexible materials in its overall structure.

After bonding the orthodontic bracket B to the corresponding actual tooth AT via the bonding adhesive, the positioning guide PG/positioning guide unit PG' can be easily and cleanly removed by being separated from the orthodontic bracket B and the actual tooth AT (as indicated by the arrows in FIG. 9). Being flexible and resilient, the flexible linking structure 50 helps removing the positioning guide PG/positioning guide unit PG'. On the other hand, the rigid guiding structure 40 being rigid has less chance for residues to remain on the orthodontic bracket B and the actual tooth AT. The shape of the positioning guide PG, especially with an extended handle portion 421, is easier to handle and manipulate.

In some embodiments, the entire positioning guide unit PG' with connected positioning guides PG can be removed as a whole. Alternatively, individual positioning guides PG are separated by cutting away the holding parts 60 (see FIG. 8), and each positioning guide PG can then be removed.

In some further embodiments, an orthodontic archwire (not shown) is provided to connect the orthodontic brackets B which have been firmly bonded to the actual teeth of the patient through the indirect bonding method 10 described above. The orthodontic archwire is resilient and is pre-shaped to match the setup dental model M2. As such, the orthodontic archwire exerts forces on the teeth through the orthodontic brackets B to bring the teeth into alignment with the pre-shaped form of the orthodontic archwire for orthodontic treatment.

As described above, the improved indirect bonding method provided in the disclosure facilitates precise and easy positioning of orthodontic brackets. Since the orthodontic brackets can be installed at proper positions on the teeth of the patient while no deviation occurs during transfer of the positioning guide onto the dentition, the ideal orthodontic treatment effect can be achieved.

Although embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. A method for producing a positioning guide used for bonding an orthodontic bracket to a tooth of a patient, the method comprising:

determining and fixing a position of the orthodontic bracket in relation to a side surface, which is a tongue side surface or a cheek side surface, of a corresponding tooth of a setup dental model, wherein the setup dental model has a dentition state of the patient's dental arch after orthodontic treatment;

forming a rigid guiding structure with a first part covering a part of an outer surface of the orthodontic bracket and a second part covering an occlusal surface of the corresponding tooth of the setup dental model, wherein the first part and the second part of the rigid guiding structure are separated, and the first part of the rigid guiding structure does not extend to engage an undercut of the orthodontic bracket;

forming a flexible linking structure to connect the first part and the second part of the rigid guiding structure to obtain the positioning guide for the orthodontic bracket, wherein the flexible linking structure fills a gap between the first part of the rigid guiding structure and a side of the orthodontic bracket on a first side, the second part of the rigid guiding structure on a second side, and the side surface of the corresponding tooth of the setup dental model on a third side, wherein the flexible linking structure also does not extend to engage an undercut of the orthodontic bracket, wherein the rigid guiding structure is inflexible and the flexible linking structure is elastic and retains form, and wherein the rigid guiding structure is harder than the flexible linking structure; and forming a barrier layer on the side of the orthodontic bracket before forming the flexible linking structure to prevent the flexible linking structure from engaging the undercut of the orthodontic bracket, wherein the barrier layer is disposed only between the side of the orthodontic bracket and the flexible linking structure, wherein the barrier layer extends only exterior of both the undercut and an external periphery of the orthodontic bracket.

2. The method as claimed in claim 1, wherein the second part of the rigid guiding structure includes a handle portion having a greater thickness than other portions of the second part, and the method further comprising:

forming a positioning guide unit by transferring a plurality of the orthodontic brackets each integrated with the respective positioning guide to an original dental model reproducing a dentition state of the patient's dental arch, and joining a number of adjacent positioning guides at the handle portions of the adjacent positioning guides using at least one holding part.

3. The method as claimed in claim 2, wherein the at least one holding part and the rigid guiding structure comprises a same material.

4. The method as claimed in claim 1, wherein the rigid guiding structure comprises a photopolymerizable material, and the formation of the rigid guiding structure comprises curing the photopolymerizable material via light energy.

5. The method as claimed in claim 4, wherein the photopolymerizable material comprises dental tray resin.

6. The method as claimed in claim 1, wherein the flexible linking structure comprises a photopolymerizable material, and the formation of the flexible linking structure comprises curing the photopolymerizable material via light energy.

7. The method as claimed in claim 6, wherein the flexible photopolymerizable material comprises ethylene vinyl acetate (EVA) resin.

8. The method as claimed in claim 1, wherein the flexible linking structure is formed on the side surface of the corresponding tooth of the setup dental model.

9. The method as claimed in claim 8, wherein the second part of the rigid guiding structure further extends to cover a part of a second side surface, opposite to the side surface, of the corresponding tooth of the setup dental model, and wherein the flexible linking structure further has a portion formed in the second part on the second side surface.

10. The method as claimed in claim 1, further comprising forming a rigid linking structure adjacent to the flexible linking structure to connect the first part and the second part of the rigid guiding structure, wherein the rigid linking structure is harder than the flexible linking structure.

11. The method as claimed in claim 10, wherein the rigid linking structure and the rigid guiding structure comprise a same material.

* * * * *